United States Patent Office 2,774,769
Patented Dec. 18, 1956

2,774,769

IMIDAZOLYLPROPIONYL CHOLINE SALTS

Arthur Stempel, River Edge, N. J., assignor to Hoffmann-La Roche Inc., Nutley, N. J., a corporation of New Jersey No Drawing. Application October 28, 1955,
Serial No. 543,609

6 Claims. (Cl. 260—309)

This invention relates to [β-(4-imidazolyl)propionyl]choline salts and to a method for synthesizing those compounds.

A particularly preferred compound of this invention is [β-(4-imidazolyl)propionyl]choline bromide which may be synthesized according to the following procedure. Urocanic acid is esterified with ethylene bromohydrin in the presence of an acid catalyst such as hydrogen chloride, concentrated sulfuric acid, toluene sulfonic acid, etc., to obtain β-bromoethyl urocanate. By treating the β-bromoethyl urocanate with trimethylamine, preferably in an inert organic solvent such as acetone, ethyl acetate, acetonitrile, etc., urocanoyl choline bromide is obtained. Reduction of urocanoyl choline bromide in the presence of palladium-charcoal catalyst produces [β-(4-imidazolyl)propionyl]choline bromide.

Other acid salts may be produced from [β-(4-imidazolyl)propionyl]choline bromide by known methods, e. g. by means of ion exchange resins, and are within the scope of this invention. These salts include organic and inorganic salts such as the halides, e. g. chloride, sulfate, citrate, tartrate, phosphate, malate, etc. Also within the scope of this invention are salts such as the chloride-hydrochloride, bromide-hydrobromide, bromide-hydrochloride, etc., which are formed in acid media. Pharmaceutically acceptable, water-soluble acid salts constitute a preferred class.

The free base, [β-(4-imidazolyl)propionyl]choline, may be produced by treating [β-(4-imidazolyl)propionyl]choline bromide with silver oxide in aqueous solution.

The [β-(4-imidazolyl)propionyl]choline salts of this invention exhibit curare-like activity with low toxicity. They may be utilized and administered as muscle relaxants in the same manner as curare.

The following examples are illustrative of the invention. All temperatures are in degrees centigrade.

*Example 1*

A suspension of 18.1 grams of urocanic acid in 300 cc. of ethylene bromohydrin was stirred while a stream of anhydrous hydrogen chloride was bubbled through. The reaction was warmed on a steam bath. After 10 minutes a clear solution resulted. The introduction of hydrogen chloride was stopped after 20 minutes, the mixture was heated on the steam bath for an additional 2 hours and then concentrated to dryness in vacuo. The crystalline residue was recrystallized from acetonitrile, yielding a white crystalline product, β-bromoethyl urocanate hydrochloride, M. P. 164–165° C.

*Example 2*

A solution of 30 grams of β-bromoethyl urocanate hydrochloride in water was neutralized with sodium bicarbonate. A white crystalline product separated. The free base, β-bromoethyl urocanate, was extracted with ethyl acetate, the solution was dried with sodium sulfate, and then concentrated to a small volume in vacuo. The product crystallized from a mixture of ethyl acetate and hexane, M. P. 125–127° C.

*Example 3*

A solution of 14.95 grams of β-bromoethyl urocanate in 800 cc. of a 20% solution of trimethylamine in acetone was heated at 70° for 20 hours. Urocanoyl choline bromide formed as a light tan solid and was filtered off. Recrystallized from acetonitrile, the product melted at 200–201°.

*Example 4*

A suspension of 500 mg. of 10% palladium on charcoal in 100 cc. of methanol was prehydrogenated and 2.0 grams of urocanoyl choline bromide were then added. There was a rapid uptake of hydrogen that stopped when one mole had reacted. The catalyst was filtered off and the filtrate was concentrated to a small volume. On addition of ether and seeding, the product, [β-(4-imidazolyl)propionyl]choline bromide, crystallized. Recrystallization from acetonitrile gave a white crystalline product melting at 149–150°.

I claim:

1. A member of the group consisting of [β-(4-imidazolyl)propionyl]choline and pharmaceutically acceptable, water-soluble acid salts thereof.

2. Pharmaceutically acceptable, water-soluble acid salts of [β-(4-imidazolyl)propionyl]choline.

3. [β-(4-imidazolyl)propionyl]choline bromide.

4. A method for producing [β-(4-imidazolyl)propionyl]choline bromide which comprises treating urocanic acid with ethylene bromohydrin to produce β-bromoethyl urocanate, reacting the last named compound with trimethylamine to produce urocanoyl choline bromide and catalytically reducing the urocanoyl choline bromide.

5. A process for the production of [β-(4-imidazolyl)-propionyl]choline bromide which comprises catalytically reducing urocanoyl choline bromide.

6. A process for the production of [β-(4-imidazolyl)propionyl]choline bromide which comprises hydrogenating urocanoyl choline bromide in the presence of palladium-charcoal catalyst.

No references cited.